(12) United States Patent
Katsube et al.

(10) Patent No.: US 12,351,081 B2
(45) Date of Patent: Jul. 8, 2025

(54) SLIDE DEVICE

(71) Applicant: NHK SPRING CO., LTD., Yokohama (JP)

(72) Inventors: Kenichi Katsube, Yokohama (JP); Tsuyoshi Matsuzawa, Yokohama (JP); Shinya Sawa, Yokohama (JP); Junichi Nakayama, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 137 days.

(21) Appl. No.: 18/337,305

(22) Filed: Jun. 19, 2023

(65) Prior Publication Data

US 2023/0415616 A1 Dec. 28, 2023

(30) Foreign Application Priority Data

Jun. 24, 2022 (JP) .................................. 2022-102110

(51) Int. Cl.
*B60N 2/07* (2006.01)

(52) U.S. Cl.
CPC ......... *B60N 2/0715* (2013.01); *B60N 2/0725* (2013.01)

(58) Field of Classification Search
CPC ... B60N 2/0705; B60N 2/0715; B60N 2/0725
See application file for complete search history.

(56) References Cited

U.S. PATENT DOCUMENTS

| 11,267,369 B2 * | 3/2022 | Yamada | B60N 2/072 |
| 2018/0370388 A1 * | 12/2018 | Nakamura | B60N 2/0224 |
| 2022/0161703 A1 * | 5/2022 | Jo | B62D 65/14 |
| 2023/0373357 A1 * | 11/2023 | Kim | B60N 2/07 |

FOREIGN PATENT DOCUMENTS

| JP | 2019-093743 A | | 6/2019 | |
| KR | 101046608 B1 | * | 7/2010 | |
| KR | 102260814 B1 | * | 6/2021 | |
| KR | 102339501 B1 | * | 12/2021 | |
| WO | WO-2010067437 A1 | * | 6/2010 | ............. B60N 2/071 |

* cited by examiner

*Primary Examiner* — Terrell L McKinnon
*Assistant Examiner* — Ding Y Tan
(74) *Attorney, Agent, or Firm* — Knobbe, Martens, Olson & Bear, LLP

(57) ABSTRACT

A slide device including: a fixed rail; a movable rail; a belt-shaped cover member including a coupling plate coupled to the movable rail at an end portion of the belt-shaped cover member, the belt-shaped cover member closing an opening groove of the fixed rail between a longitudinal end portion of the fixed rail and the movable rail; and a slide cover that covers a periphery of a side edge portion of the cover member, wherein the slide cover includes: an upper wall; a lower wall; and a rib disposed along a sliding direction of the movable rail and protruding in a direction toward the side edge portion of the cover member, on at least one of a surface of the upper wall facing the side edge portion of the cover member or a surface of the lower wall facing the side edge portion of the cover member.

5 Claims, 11 Drawing Sheets

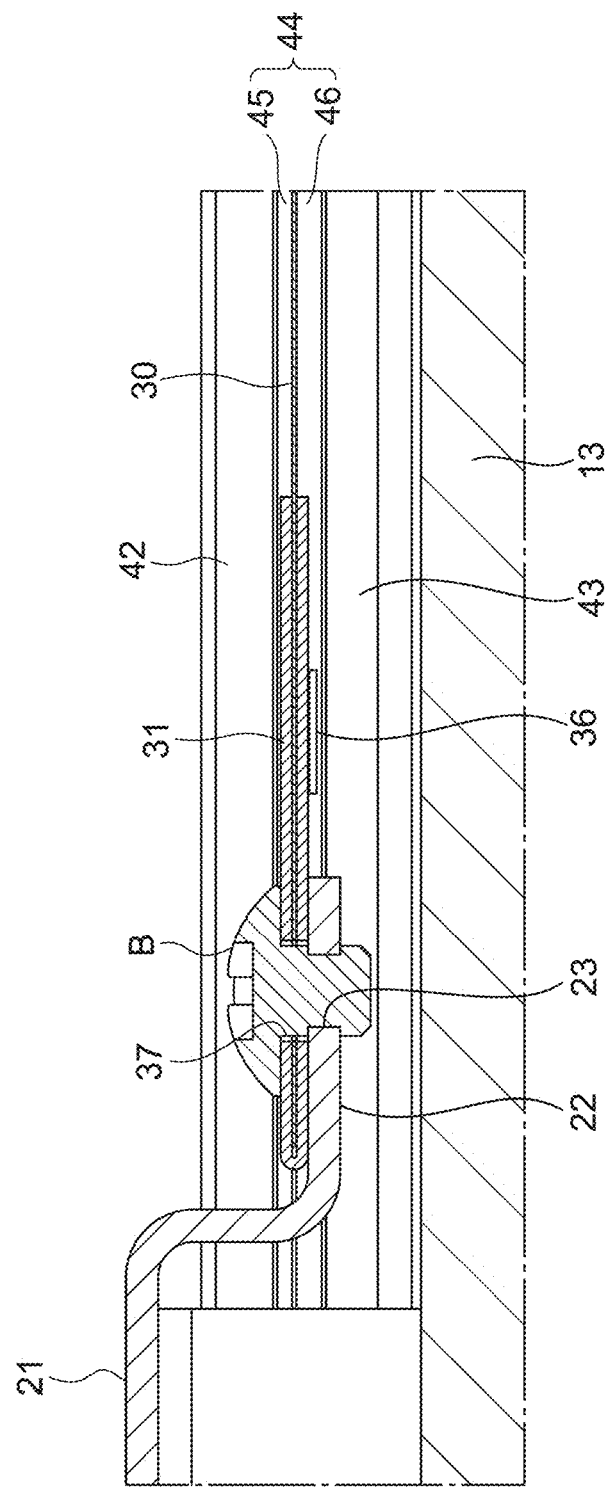

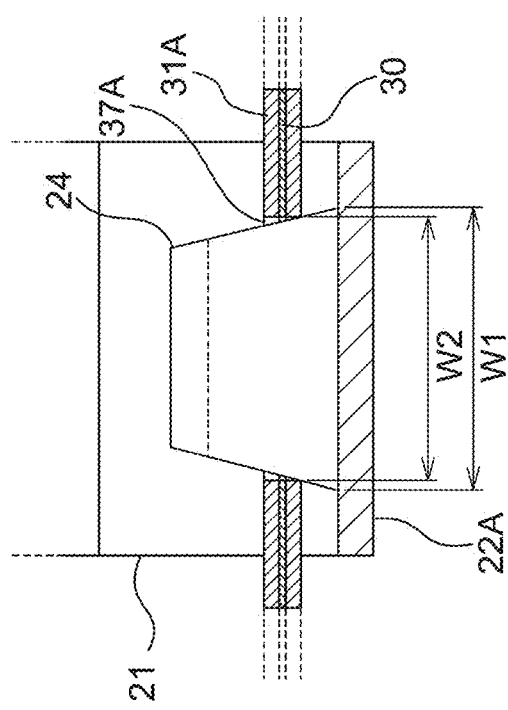

SLIDE DEVICE

CROSS-REFERENCE TO RELATED APPLICATION

This application is based on and claims priority under 35 USC 119 from Japanese Patent Application No. 2022-102110 filed on Jun. 24, 2022, the disclosure of which is incorporated by reference herein.

BACKGROUND

Technical Field

The present disclosure relates to a slide device.

Related Art

In order to slide a seat, for example, a vehicle seat, in a front-rear direction and to stand still at an appropriate position, a slide device installed between a vehicle body and the seat has been conventionally used.

Japanese Patent Application Laid-Open (JP-A) No. 2019-093743 discloses a slide device including a groove-shaped seat rail whose upper portion is opened, leg portions that engage with the seat rail and movably support a seat along the seat rail, and an elongated cover member that closes an opening of the seat rail. In addition, it is also described that a wall (specifically, an upper wall portion and a posture maintaining wall) is provided so as to cover a side edge portion of the cover member from a vertical direction.

As in JP-A No. 2019-093743, it is preferable to partially cover the side edge portion of the cover member with the wall because the side edge portion of the cover member can be protected and the posture of the cover member can be maintained. However, as in the structure disclosed in JP-A No. 2019-093743, in a case in which the above-described covering structure is formed of the wall linearly extending in a horizontal direction, it is difficult to ensure durability against a load in the vertical direction since the wall is cantilevered. Therefore, there is a possibility that the wall portion is plastically deformed greatly in a downward direction in a case in which a large load in the downward direction is generated, for example, in a case in which an occupant of the vehicle steps on the wall portion. Such deformation may not only impair the aesthetic appearance but also damage the side edge portion of the cover member.

SUMMARY

In consideration of the above-described problems, an object of the present disclosure is to provide a slide device having improved durability in the vertical direction in addition to the protection of the cover member and the maintenance of the posture.

In order to achieve the above object, a slide device according to a first aspect of the present disclosure includes: a fixed rail including an opening groove in an upper portion of the fixed rail; a movable rail slidably coupled to the fixed rail; a belt-shaped cover member including a coupling plate coupled to the movable rail at an end portion of the belt-shaped cover member, the belt-shaped cover member closing the opening groove between a longitudinal end portion of the fixed rail and the movable rail; and a slide cover that covers a periphery of a side edge portion of the cover member, in which the slide cover includes: an upper wall facing an upper surface of the side edge portion of the cover member; a lower wall facing a lower surface of the side edge portion of the cover member; and a rib disposed along a sliding direction of the movable rail and protruding in a direction toward the side edge portion of the cover member on at least one of a surface of the upper wall facing the side edge portion of the cover member and a surface of the lower wall facing the side edge portion of the cover member.

In such a slide device, since the rib is provided so as to fill a gap between the upper wall and the lower wall of the slide cover, it is possible to suppress plastic deformation of the upper wall in a case in which stress (specifically, bending stress) is generated in a downward direction on the upper wall. As a result, it is possible to provide a highly durable slide device that is less likely to be damaged even if being stepped on by an occupant when the slide device is mounted on a vehicle or the like.

A slide device according to a second aspect of the present disclosure is the slide device according to the first aspect of the present disclosure, in which the rib includes an upper wall-side rib provided on the surface of the upper wall, the surface facing the side edge portion of the cover member, and a lower wall-side rib provided on the surface of the lower wall, the surface facing the side edge portion of the cover member, and the upper wall-side rib and the lower wall-side rib are disposed such that at least a part of the upper wall-side rib and the lower wall-side rib face each other with the side edge portion of the cover member interposed between the upper wall-side rib and the lower wall-side rib.

In such a slide device, since the upper wall-side rib and the lower wall-side rib face each other, a movable range of the upper wall 42 in a vertical direction is reduced, and plastic deformation of the upper wall can be further suppressed. Furthermore, since the ribs face each other with the cover member interposed between the ribs, it is possible to prevent the cover member from greatly moving in the vertical direction.

A slide device according to a third aspect of the present disclosure is the slide device according to the second aspect of the present disclosure, in which at least a part of the side edge portion of the cover member is sandwiched between the upper wall-side rib and the lower wall-side rib.

In such a slide device, since the side edge portion of the cover member is sandwiched by the ribs, rattling in the vertical direction can be substantially eliminated.

A slide device according to a fourth aspect of the present disclosure is the slide device according to any one of the first to third aspects of the present disclosure, further including a reel rotatably attached to the longitudinal end portion of the fixed rail and around which the cover member is wound.

In such a slide device, by winding the cover member around the reel, an installation space of the cover member can be reduced, and the entire slide device can be downsized. Furthermore, since the cover member can be pulled out via the reel, the opening groove can be closed regardless of the position of the movable rail.

A slide device according to a fifth aspect of the present disclosure is the slide device according to any one of the first to fourth aspects of the present disclosure, in which the coupling plate is configured of a rectangular plate-like body attached to an end portion of the cover member on a side of the movable rail, and both end surfaces of the coupling plate in a width direction intersecting with the sliding direction extend along the adjacent rib.

In such a slide device, since a side surface of the coupling plate extends along the rib, the cover member can be suppressed from moving in a left-right direction.

A slide device according to a sixth aspect of the present disclosure is the slide device according to any one of the first to fifth aspects of the present disclosure, in which the movable rail includes a coupling piece adjusted such that a length in a width direction intersecting the sliding direction gradually decreases from a proximal end portion toward a distal end portion, and the coupling plate includes a coupling hole into which the coupling piece is inserted, the coupling hole having a length in a direction along the width direction shorter than a length in the width direction at the proximal end portion of the coupling piece.

In such a slide device, rattling along the width direction of the cover member with respect to the movable rail can be suppressed at the coupling portion between the movable rail and the cover member.

According to the slide device of the present disclosure, it is possible to improve the durability in the vertical direction while protecting the cover member and maintaining the posture.

BRIEF DESCRIPTION OF THE DRAWINGS

Exemplary embodiments of the present invention will be described in detail based on the following figures, wherein:

FIG. 4B is an enlarged arrow view of a portion D in FIG. 4A.

FIG. 5B is an enlarged cross-sectional view of a main part taken along line E-E in FIG. 5A.

DETAILED DESCRIPTION

Figure 1:
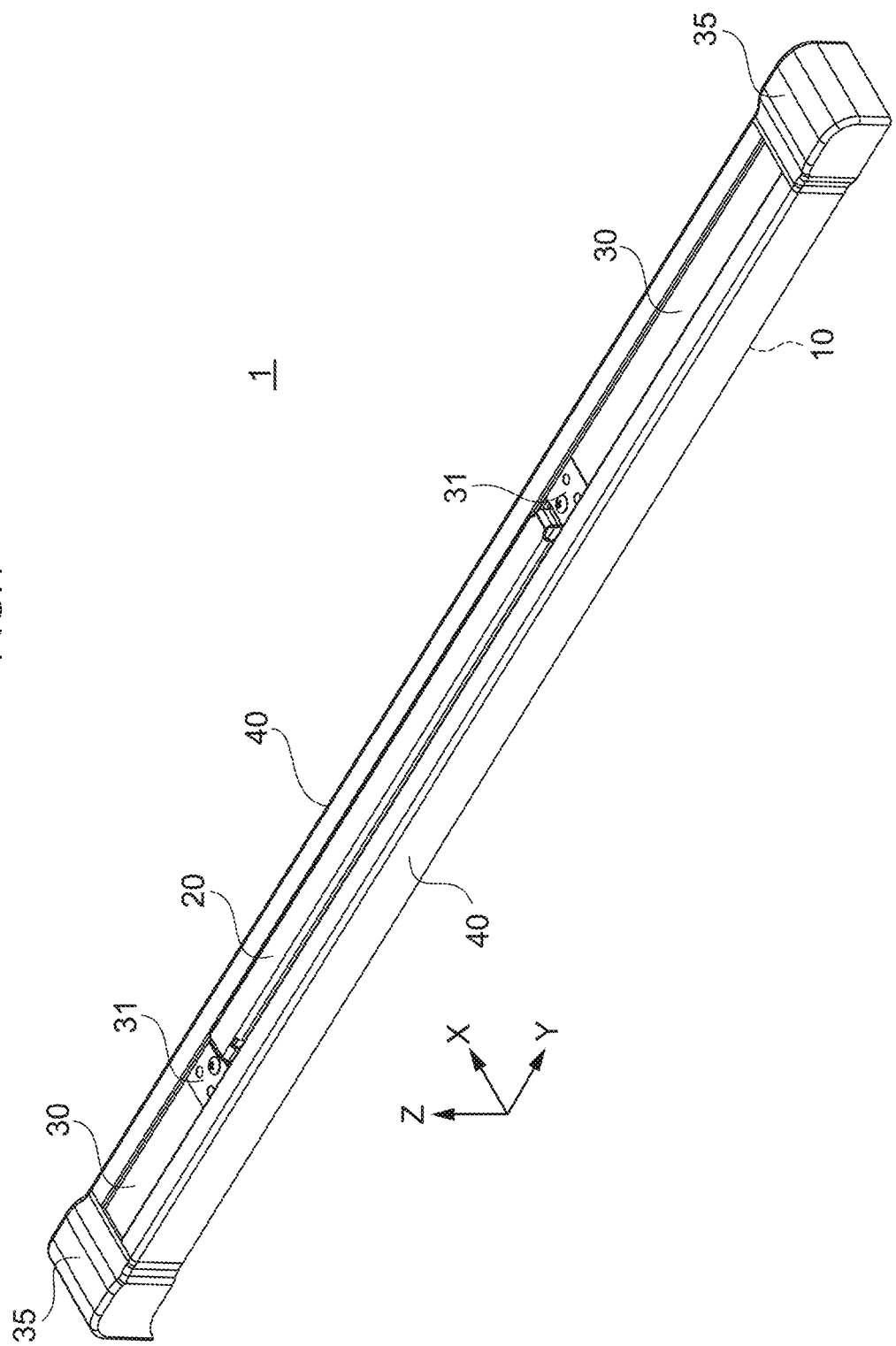
FIG. 1 is a schematic perspective view illustrating an example of a slide device according to an embodiment of the present disclosure.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Hereinafter, embodiments for carrying out the present disclosure will be described with reference to the drawings. Note that, in the following, a range necessary for description for achieving the object of the present disclosure will be schematically illustrated, a range necessary for description of a corresponding portion of the present disclosure will be mainly described, and portions for which description is omitted will be based on known techniques. Furthermore, in a case in which a plurality of members same as or corresponding to each other is included in the drawing, only some of the members may be denoted by reference signs in order to make the drawing easy to see.

Figure 2:
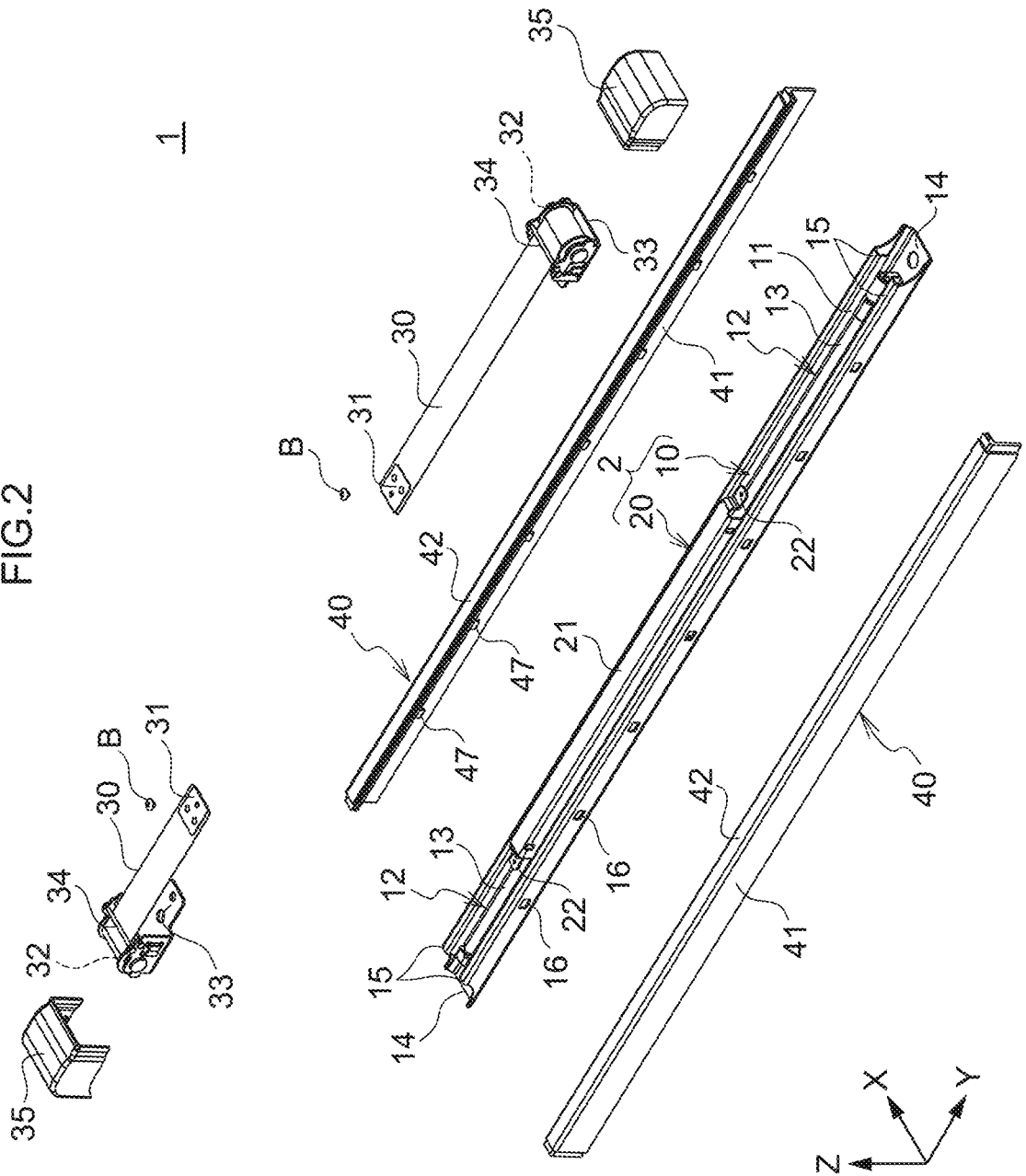
FIG. 2 is a partially exploded perspective view of the slide device illustrated in FIG. 1.

FIG. 1 is a schematic perspective view illustrating an example of a slide device according to an embodiment of the present disclosure. Furthermore, FIG. 2 is a partially exploded perspective view of the slide device illustrated in FIG. 1. A slide device 1 according to the present embodiment illustrated in FIGS. 1 and 2 can be applied to a seat, for example, a seat mounted on a vehicle, and may slide the seat in one direction (for example, a front-rear direction) with respect to a floor surface of the vehicle. Note that the use of the slide device 1 according to the present embodiment is not limited to the above. Furthermore, in the following description, it is assumed that an X direction illustrated in FIG. 1 is defined as a left-right direction (or a width direction), a Y direction is defined as a front-rear direction, and a Z direction is defined as a vertical direction.

As illustrated in FIGS. 1 and 2, the slide device 1 according to the present embodiment includes a slide rail unit 2. The slide rail unit 2 includes at least a fixed rail 10 attached to a floor surface of a vehicle, and a movable rail 20 attached to a bottom surface of the seat and slidably coupled to the fixed rail 10. Both the fixed rail 10 and the movable rail 20 constituting the slide rail unit 2 can be formed by bending a metal plate or the like.

The fixed rail 10 can be formed of a so-called lower rail which is directly or indirectly fixed to the floor surface of the vehicle and is long in the front-rear direction of the vehicle. The fixed rail 10 may include an accommodation space 11 extending in the front-rear direction for accommodating a part of the movable rail 20 therein, and may have a shape in which an upper portion thereof is opened as an opening groove 12. A lead screw 13 that extends in the front-rear direction and guides the movement of the movable rail 20 may be provided in the accommodation space 11.

The fixed rail 10 may have a shape in which both ends in the left-right direction of a long metal plate (for example, as illustrated in FIGS. 6 and 7) are bent inward. Then, by bending the bent both ends in the left-right direction so as to be wound inward, an upper portion of the fixed rail 10 may have a structure including the opening groove 12 and a substantially horizontal upper surface 15 extending to the left and right of the opening groove 12.

The movable rail 20 can be constituted by a so-called upper rail directly or indirectly attached to a seat side. The movable rail 20 is accommodated in the accommodation space 11 of the fixed rail 10, and a part of the movable rail may be exposed to the outside of the opening groove 12 in order to attach it to a part of the seat, for example, to a back surface of a seat back frame. The movable rail 20 may include a movable rail body 21 coupled to the fixed rail 10 in a slidable manner in the front-rear direction.

Coupling tongue pieces 22 and 22 to which a coupling plate 31 of a cover member 30 described later is coupled may be provided at both end portions in the front-rear direction of the movable rail body 21. Furthermore, the coupling tongue pieces 22 and 22 may be provided with screw holes 23 and 23 penetrating in the vertical direction at substantially central portions thereof. In relation to the above-described structure, a sliding direction of the movable rail 20 in the present embodiment corresponds to the front-rear direction indicated as the Y direction in FIGS. 1 and 2.

Furthermore, as illustrated in FIGS. 1 and 2, the slide device 1 according to the present embodiment includes a pair of cover members 30 and 30 for closing the opening groove 12 formed in front of and behind the movable rail 20 and exposed to the outside in the opening groove 12 of the fixed rail 10. In addition, the slide device 1 further includes a pair of slide covers 40 and 40 that are disposed so as to sandwich the fixed rail 10 from the left and right direction and cover side edge portions 30L and 30R (see FIG. 5 and the like) of the cover members 30 and 30, respectively. Note that, in the slide device 1 according to the present embodiment, two cover members 30 are provided in front of and behind the movable rail 20, but the structures of both the cover members 30 can be substantially the same. Therefore, hereinafter, each structure of the cover member 30 disposed in a rear portion in FIG. 1 and the slide cover 40 related thereto will be described as a representative.

Figure 3:
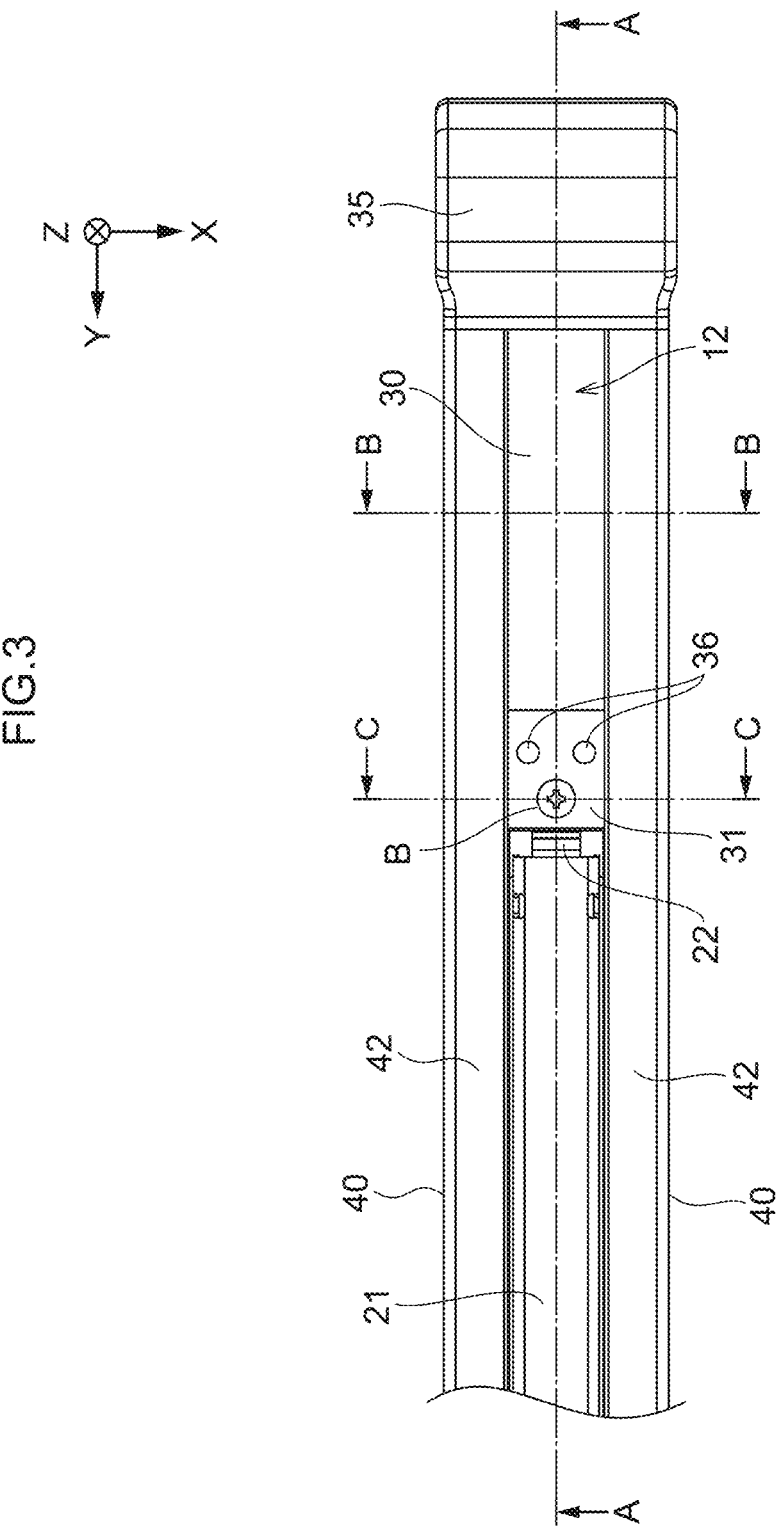
FIG. 3 is an enlarged plan view illustrating a rear portion of the slide device illustrated in FIG. 1 in an enlarged manner.
Figure 4A:
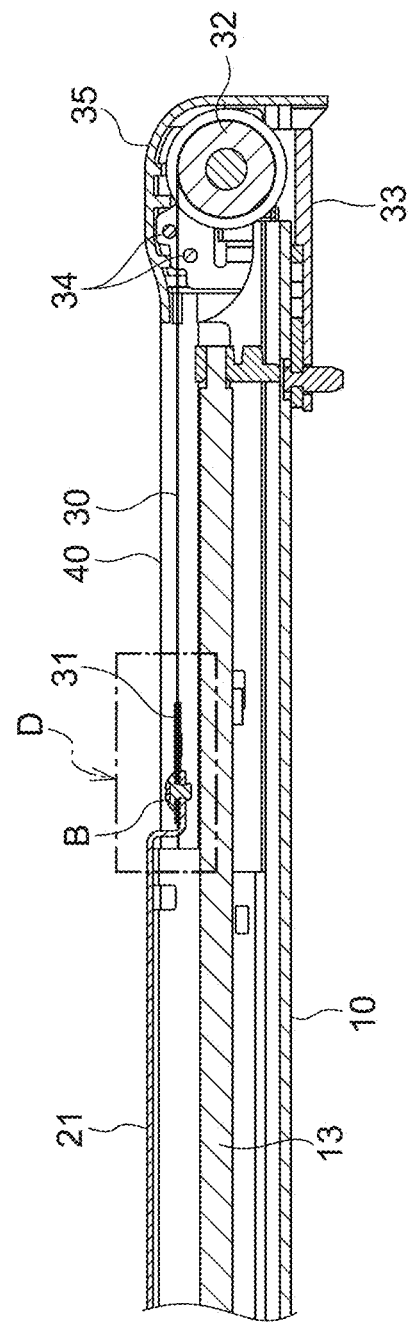
FIG. 4A is a cross-sectional view taken along line A-A in FIG. 3.

FIG. 3 is an enlarged plan view illustrating a rear portion of the slide device illustrated in FIG. 1 in an enlarged manner. Furthermore, FIG. 4 illustrates a cross-sectional structure of the slide device illustrated in FIG. 3 taken along the front-rear direction. FIG. 4A is a cross-sectional view taken along line A-A in FIG. 3, and FIG. 4B is an enlarged arrow view of a portion D in FIG. 4A.

As illustrated in FIGS. 1 to 4, the cover member 30 may have the coupling plate 31 coupled to the movable rail 20 at one end thereof, and may close the opening groove 12 between two end portions 14 in a longitudinal direction of the fixed rail 10 and two end portions of the movable rail 20. The cover member 30 can be formed of a thin plate member of about 0.1 to 0.2 mm formed in a long belt shape along the sliding direction of the movable rail 20. Furthermore, the cover member 30 may be formed of one band-shaped thin plate member, or may be formed by coupling a plurality of relatively short thin plate members in a band shape. Note that the thickness of the cover member 30 is not limited to the above range, and may be set to a larger thickness, for example, about 0.5 mm.

The coupling plate 31 can be formed of, for example, a metal plate body thicker than the cover member 30. For example, as illustrated in FIG. 2, the coupling plate 31 may be attached to a central portion of one end portion of the cover member 30. As a specific attachment structure, for example, as illustrated in FIG. 4B, a structure in which a metal plate long in the front-rear direction constituting the coupling plate 31 is bent and fixed so as to sandwich the end portion of the cover member 30 between the metal plates can be adopted. As a method of fixing the coupling plate 31 to the cover member 30, for example, a method of fixing the metal plate by performing half punch processing (half punching) at an appropriate position of the metal plate can be adopted. In the present embodiment, for example, as illustrated in FIG. 3, half punch portions 36 formed by the half punching are formed at two positions of the coupling plate 31.

The coupling plate 31 attached to the cover member 30 by the above-described method can be a plate-like body having a rectangular shape in plan view. Note that the term "rectangular shape" as used herein includes not only a strict quadrangular shape but also a shape in which corner portions are chamfered or rounded.

Furthermore, a coupling hole 37 for coupling to the coupling tongue piece 22, which vertically penetrates the coupling plate 31 and the cover member 30, may be formed in a substantially central portion of the coupling plate 31. After a screw B is inserted into the coupling hole 37, the screw B is screwed into the screw hole 23 to be screwed, whereby the movable rail 20 and the cover member 30 can be coupled.

By adopting the screw fastening structure described above, the movable rail 20 and the cover member 30 can be coupled without rattling. However, in a case in which the screw B is loosened for some reason, backlash may occur in the left-right direction (and the front-rear direction) between the movable rail 20 and the cover member 30. In consideration of this point, in the slide device 1 according to the present embodiment, the coupling structure between the movable rail 20 and the cover member 30 can be changed in order to effectively suppress the backlash in the left-right direction.

Figure 5A:
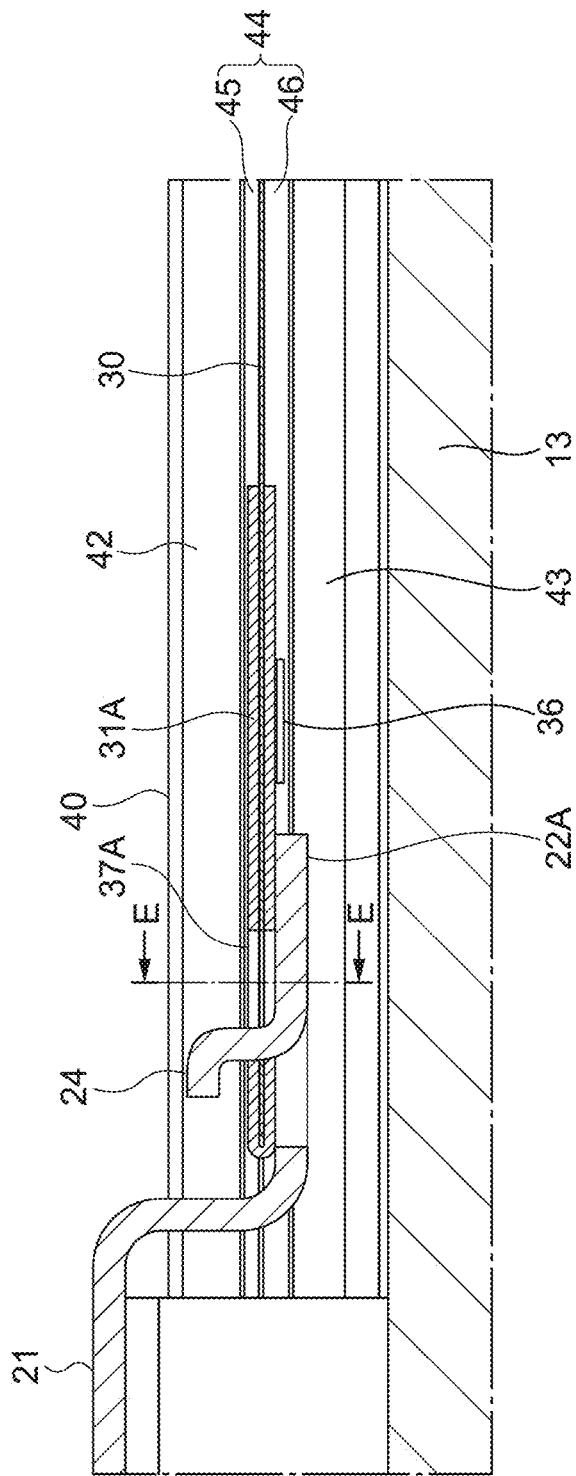
FIG. 5A is an enlarged view corresponding to FIG. 4B.

FIG. 5 illustrates a modification example of a coupling structure between a movable rail and a cover member. FIG. 5A is an enlarged view corresponding to FIG. 4B, and FIG. 5B is an enlarged cross-sectional view of a main part taken along line E-E in FIG. 5A. Note that in FIG. 5B, the coupling portion between the movable rail 20 and the cover member 30 is illustrated in an enlarged manner, and the peripheral members, for example, the slide cover 40 and the like are not illustrated. Furthermore, in the modification example described below, points different from the structure described above as one embodiment will be mainly described, and points having the same structure as that according to one embodiment will be denoted by the same reference signs, and description thereof will be omitted.

As a coupling structure of the movable rail 20 and the cover member 30, as illustrated in FIG. 5, instead of the above-described screw fastening structure, a structure in which a locking piece 24 as an example of a coupling piece is formed on a coupling tongue piece 22A and the movable rail 20 and the cover member 30 are coupled using the locking piece 24 can be adopted.

The locking piece 24 can be formed of a substantially hook-shaped member formed by cutting and raising a part of the coupling tongue piece 22A. As illustrated in FIG. 5B, the locking piece 24 is preferably adjusted so that a length in the left-right direction gradually decreases from a proximal end portion coupled to the coupling tongue piece 22 toward a distal end portion extending upward. Thus, the locking piece 24 is formed of a cut-and-raised piece having a substantially trapezoidal shape when viewed from the front. Note that the shape of the locking piece 24 is not limited to the above-described shape, and for example, a shape in which the length in the left-right direction decreases stepwise from the proximal end portion toward the distal end portion as viewed from the front may be adopted.

A coupling hole 37A into which the locking piece 24 is inserted is formed in the coupling plate 31A locked by the locking piece 24 described above. Here, it should be particularly noted that a width W1 of the coupling hole 37A in the left-right direction is set to be smaller than a width W2 of the proximal end portion of the locking piece 24 in the left-right direction. When the width W1 of the coupling hole 37A is smaller than the width W2 of the proximal end portion of the locking piece 24, both sides in the left-right direction of the coupling hole 37A into which the locking piece 24 is inserted are locked to a side surface of the locking piece 24. As a result, it is possible to easily suppress the occurrence of backlash in the left-right direction between the coupling hole 37A and the locking piece 24.

The other end portion of the cover member 30 opposite to the one end portion to which the coupling plate 31 is attached can be wound around a reel 32 rotatably attached to the end portion 14 in the longitudinal direction of the fixed rail 10. In this regard, the cover member 30 according to the present embodiment may employ a flexible member that can be wound in a roll shape following the reel 32.

The reel 32 may be rotatably attached to a reel bracket 33 that is fixed to the end portion 14 of the fixed rail 10. Furthermore, the reel 32 may be provided with a biasing member (not illustrated) (for example, a torsion spring) that biases the wound cover member 30 in a winding direction. The other end portion of the cover member 30 is preferably fixed to the reel 32.

The reel bracket 33 may be provided with two guide pins 34 disposed so as to sandwich a movement path of the cover member 30 in order to guide the operation of the cover member 30 that moves following the sliding movement of the movable rail 20. Furthermore, a reel cover 35 that covers the outer periphery of the reel 32 may be attached above the reel bracket 33. A specific attachment structure between the reel bracket 33 and the reel cover 35 is not particularly limited, and a known attachment structure may be adopted.

In the present embodiment, the cover member 30 on the front side and the cover member 30 on the rear side are respectively wound around the reel 32 on the front side and the reel 32 on the rear side in the same manner, but the support structure of the cover member 30 is not limited thereto. Specifically, for example, one long cover member 30 may be wound around the reel 32 on the front side and the reel 32 on the rear side. In this case, it is preferable that the cover member 30 is formed as one long belt-like body, the coupling plates 31 are attached to both end portions thereof, and the cover member is wound around both the reels 32 in a state where the cover member is coupled to the coupling tongue piece 22 at the end portion of the movable rail 20 via the coupling plates 31. Even with such a structure, it is possible to close the opening groove 12 of the fixed rail 10 opened in the front-rear direction of the movable rail 20.

Figure 6A:
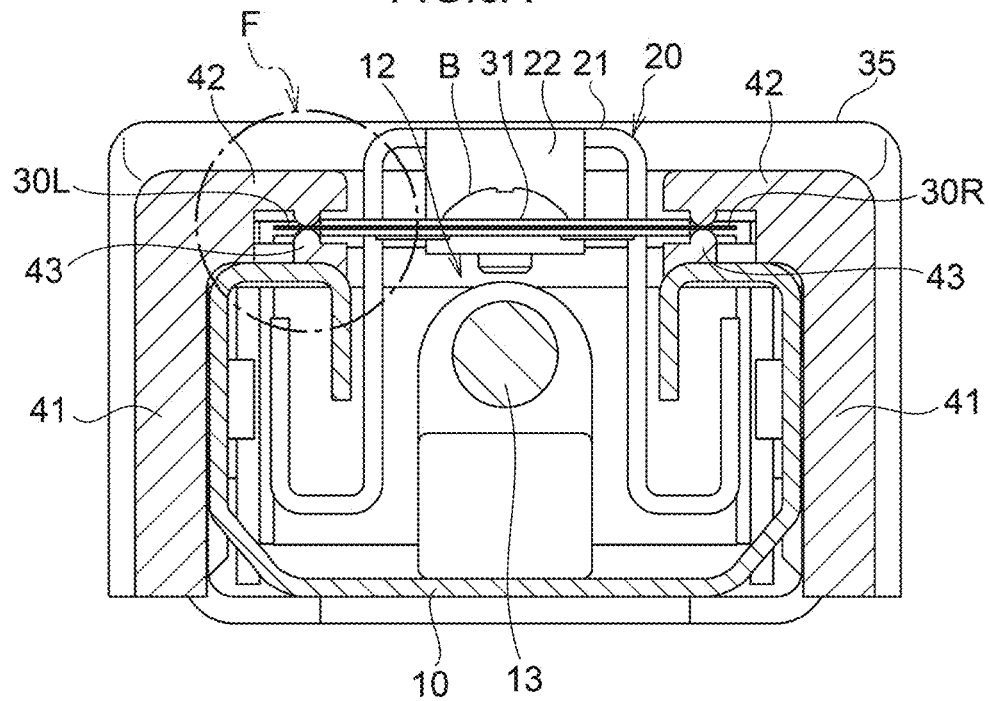
FIG. 6A is a cross-sectional view taken along line B-B in FIG. 3.
Figure 6B:
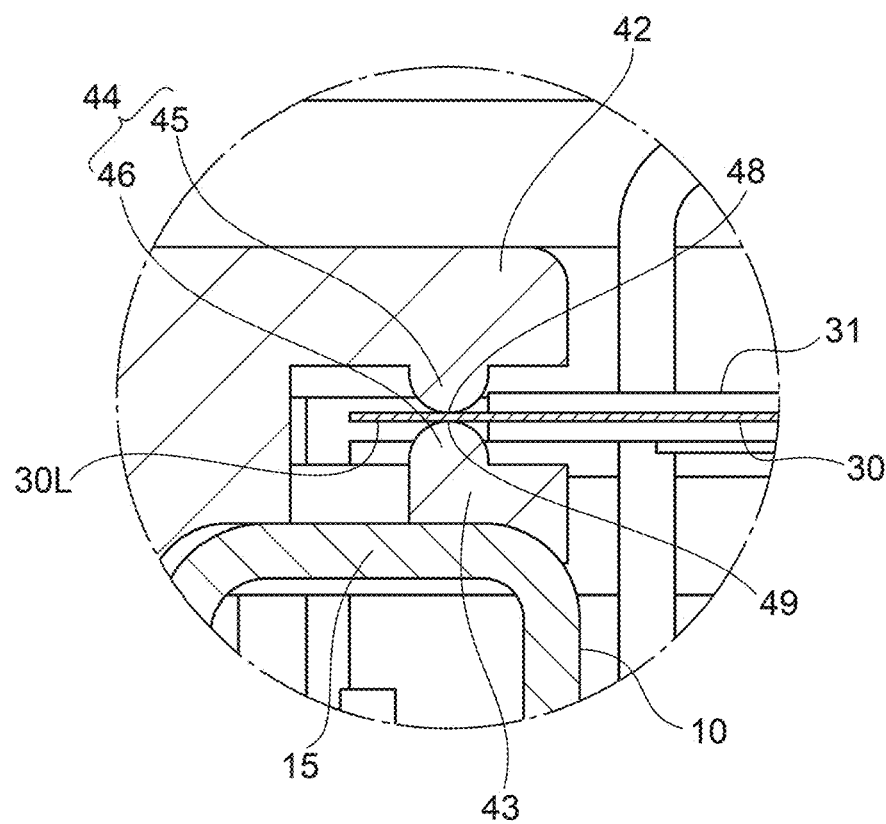
FIG. 6B is an enlarged arrow view of a portion F in FIG. 6A.
Figure 7A:
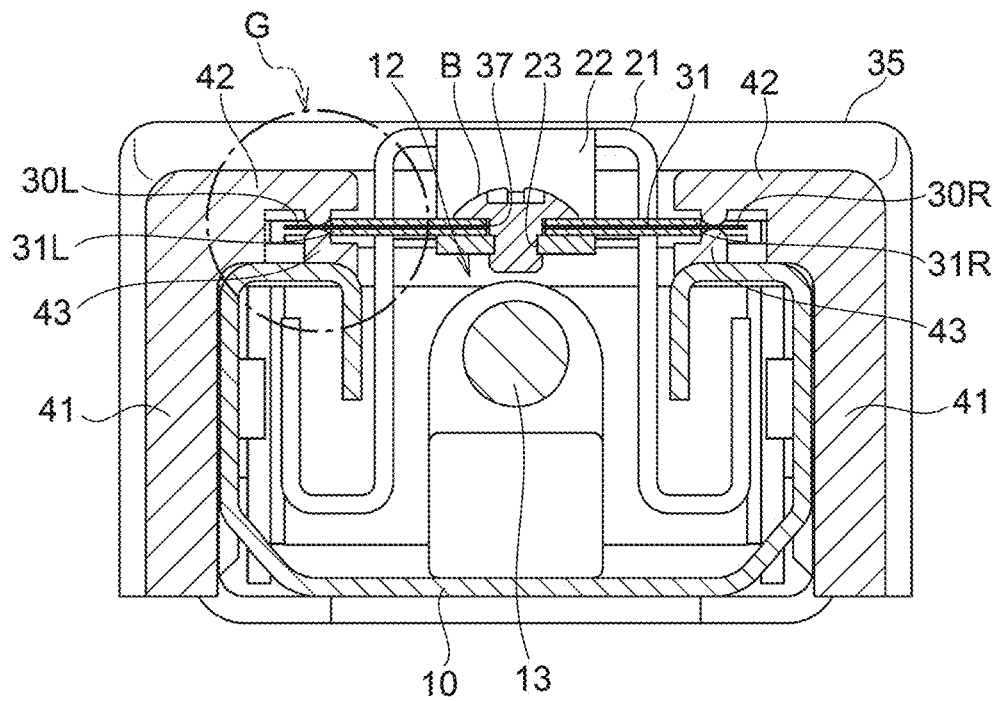
FIG. 7A is a cross-sectional view taken along line C-C in FIG. 3.
Figure 7B:
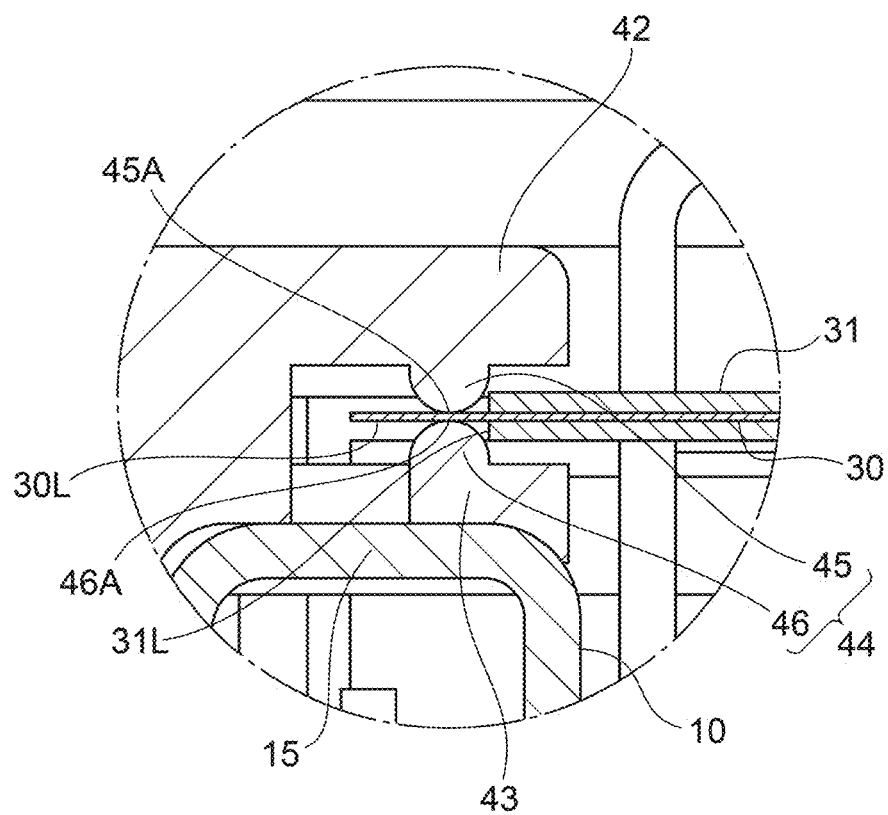
FIG. 7B is an enlarged view of a portion G in FIG. 7A.

FIG. 6 illustrates a cross-sectional structure of the slide device illustrated in FIG. 3 taken along a left-right direction. FIG. 6A is a cross-sectional view taken along line B-B in FIG. 3, and FIG. 6B is an enlarged arrow view of a portion F in FIG. 6A. Furthermore, FIG. 7 illustrates another cross-sectional structure obtained by cutting the slide device illustrated in FIG. 3 along the left-right direction. FIG. 7A is a cross-sectional view taken along line C-C in FIG. 3, and FIG. 7B is an enlarged view of a portion G in FIG. 7A. Hereinafter, the structure of the slide cover 40 that covers the peripheries of the side edge portions 30L and 30R of the cover member 30 described above will be described mainly with reference to FIGS. 6 and 7.

As illustrated in FIGS. 1 to 7, the slide cover 40 can be formed of, for example, a resin molded article using synthetic resin or the like. The slide cover 40 can include a slide cover main body 41 elongated in the front-rear direction attached along left and right side surfaces of the fixed rail 10, an upper wall 42 extending in the left-right direction from a surface of an upper end portion of the slide cover main body 41 in contact with the fixed rail 10, a lower wall 43 extending in the left-right direction from a surface in contact with the fixed rail 10 similarly to the upper wall 42 between the upper surface 15 and the upper wall 42 of the fixed rail 10, and a rib 44 formed on at least one of the upper wall 42 and the lower wall 43. Note that the left-right direction here corresponds to the width direction intersecting the sliding direction. Furthermore, the slide cover main body 41, the upper wall 42, the lower wall 43, and the rib 44 described above may be formed by integral molding.

The slide cover main body 41 may be formed of a plate-like body whose length in the front-rear direction is substantially the same as a length in the front-rear direction of the fixed rail 10 and whose length in the vertical direction is longer than a length in the vertical direction of the fixed rail 10. As illustrated in FIG. 2, a plurality of (for example, seven) attachment claw portions 47 may be provided on one surface of the slide cover main body 41 in the left-right direction. The slide cover 40 can be fixed to the fixed rail 10 by inserting and engaging each of the attachment claw portions 47 into each of attachment holes 16 formed in the side surface of the fixed rail 10. Note that the attachment structure of the fixed rail 10 and the slide cover 40 is not limited to the above, and other known fixing structures can be adopted.

The upper wall 42 is a member facing the upper surfaces of the side edge portions 30L and 30R of the cover member 30 coupled to the movable rail 20. The upper wall 42 extends in the horizontal direction from an upper end portion of the slide cover main body 41 toward the cover member 30, and may face the upper surfaces of the side edge portions 30L and 30R of the cover member 30 with a predetermined gap interposed between a lower surface of the upper wall and the upper surfaces of the side edge portions.

The lower wall 43 is a member facing the lower surfaces of the side edge portions 30L and 30R of the cover member 30 coupled to the movable rail 20. The lower wall 43 is disposed between the upper wall 42 of the slide cover 40 attached to the fixed rail 10 and the upper surface 15 of the fixed rail 10, and may extend in the horizontal direction toward the cover member 30 similarly to the upper wall 42. The upper surface of the lower wall 43 and the lower surfaces of the side edge portions 30L and 30R of the cover member 30 may face each other with a predetermined gap between the upper surface of the lower wall and the lower surfaces of the side edge portions.

The rib 44 protrudes from at least one of a lower surface of the upper wall 42 facing the side edge portions 30L and 30R of the cover member 30 and an upper surface of the lower wall 43 facing the side edge portions 30L and 30R of the cover member 30 in a direction toward the side edge portions 30L and 30R of the cover member 30. In the present embodiment, in particular, as illustrated in FIGS. 6B and 7B, an example is illustrated in which an upper wall-side rib 45 provided on the lower surface of the upper wall 42 and a lower wall-side rib 46 provided on the upper surface of the lower wall 43 are included.

When the upper wall 42 is pressed downward due to, for example, an occupant of the vehicle placed on the upper wall, the above-described rib 44 comes into contact with an opposing member, for example, the upper wall 42, the lower wall 43, or another rib 44. Therefore, the rib 44 functions to suppress downward displacement of the upper wall 42. As a result, in the slide device 1 according to the present embodiment, it can be said that the downward plastic deformation of the upper wall 42 is suppressed and the durability thereof is improved.

Describing the rib 44 in more detail, the upper wall-side rib 45 of the rib 44 can be configured by a ridge formed to extend over the entire length of the upper wall 42 in the front-rear direction at a position slightly close to a side of the slide cover main body 41 from the distal end portion of the upper wall 42 in the left-right direction. Similarly, the lower wall-side rib 46 can be configured by a ridge formed to extend over the entire length in the front-rear direction of the lower wall 43 at a position slightly close to the side of the slide cover main body 41 from the distal end portion of the lower wall 43 in the left-right direction. Each of the upper wall-side rib 45 and the lower wall-side rib 46 may have a circular shape with rounded corners at each of tips 48 and 49 when viewed from the front.

Here, the upper wall-side rib 45 and the lower wall-side rib 46 are preferably disposed such that at least a part thereof faces each other with the side edge portions 30L and 30R of the cover member 30 interposed between the upper wall-side rib 45 and the lower wall-side rib 46. In a case in which the upper wall-side rib 45 and the lower wall-side rib 46 are disposed so as to face each other in this manner, when the upper wall 42 is pressed in the downward direction, the tip 48 of the upper wall-side rib 45 and the tip 49 of the lower wall-side rib 46 come into contact with each other via the side edge portions 30L and 30R of the cover member 30, whereby plastic deformation of the upper wall 42 can be effectively suppressed.

In addition to the above structure, the upper surface 15 of the fixed rail 10 is preferably disposed below the tip 48 of the upper wall-side rib 45 and the tip 49 of the lower wall-side rib 46. With such an arrangement, the stress in the downward direction transmitted from the tip 48 of the upper wall-side rib 45 acts on a part of the upper surface 15 formed of the horizontal plane, so that the stress can be stably supported.

Meanwhile, in JP-A No. 2019-093743, a wall that covers the upper and lower sides of a part of the cover member is disposed at a position sufficiently away from the cover member. Since the side edge portion of the cover member is not particularly supported, rattling may occur in the vertical direction of the cover member.

In consideration of the above points, the slide device 1 according to the present embodiment employs a structure in which at least a part of the side edge portions 30L and 30R of the cover member 30 is sandwiched between the tip 48 of the upper wall-side rib 45 and the tip 49 of the lower wall-side rib 46. In other words, in the slide device 1 according to the present embodiment, the tip 48 of the upper wall-side rib 45 and the tip 49 of the lower wall-side rib 46 are brought into line contact with the cover member 30, respectively, to sandwich the side edge portions 30L and 30R of the cover member 30. As described above, the side edge portions 30L and 30R of the cover member 30 are sandwiched by the ribs 44 from the vertical direction, whereby the side edge portions 30L and 30R are supported, and rattling of the cover member 30 in the vertical direction can be substantially eliminated.

As described above, in the present embodiment, the side edge portions 30L and 30R of the cover member 30 are sandwiched by the ribs 44, but the side edge portions 30L and 30R of the cover member 30 may not be in contact with the ribs 44. Even in a case in which there is a gap between the ribs 44 and the side edge portions 30L and 30R of the cover member 30, the gap generated above and below the side edge portions 30L and 30R of the cover member 30 can be reduced as compared with the case where the ribs 44 are not provided. As a result, in addition to the improvement in durability described above, occurrence of large rattling generated in the vertical direction can be suppressed.

Furthermore, in the present embodiment, the upper wall-side rib 45 and the lower wall-side rib 46 are formed by ridges extending in the front-rear direction, but the shapes of the upper wall-side rib 45 and the lower wall-side rib 46 are not limited thereto. For example, one of the upper wall-side rib 45 and the lower wall-side rib 46 may be formed of an island-shaped rib disposed along the front-rear direction at a predetermined interval. In this case, the island-shaped rib and the cover member 30 are in point contact, and the side edge portions 30L and 30R of the cover member 30 are held at the point contact portion.

By adopting the above-described configuration, in the slide device 1 according to the present embodiment, durability against stress in the vertical direction can be improved, and backlash in the vertical direction generated in the cover member 30 can be suppressed or substantially eliminated.

By the way, as described above, the cover member 30 can effectively suppress the backlash in the left-right direction with respect to the movable rail 20 by devising the coupling structure with respect to the movable rail 20. However, since the cover member 30 employs a relatively flexible member, rattling of the entire cover member 30 in the left-right direction may not be completely eliminated only by suppressing rattling of the movable rail 20 in the left-right direction. Therefore, in the slide device 1 according to the present embodiment, it is possible to adopt a structure for more effectively suppressing rattling of the cover member 30 in the left-right direction described below.

In the present embodiment, the coupling plate 31 attached to the end portion of the cover member 30 is formed of a plate-like body having a rectangular shape in plan view as described above. In this regard, the slide device 1 according to the present embodiment employs a structure in which the cover member 30 is prevented from rattling in the left-right direction by restricting movement of the coupling plate 31 in the left-right direction.

Specifically, as illustrated in FIG. 7B, the slide device 1 according to the present embodiment adopts a structure in which both end surfaces 31L and 31R located in the left-right direction of the coupling plate 31 are extended along the adjacent ribs 44. At this time, the arrangement or size of the ribs 44 is preferably adjusted such that the inner surface thereof comes into contact with or approaches the both end surfaces 31L and 31R of the coupling plate 31 coupled to the movable rail 20. Note that the both end surfaces 31L and 31R of the coupling plate 31 and the ribs 44 are preferably in contact with each other to such an extent that a load of movement of the cover member 30 is not generated.

As described above, when the structure in which the both end surfaces 31L and 31R of the coupling plate 31 extend along the extending direction of the ribs 44 is adopted, the both end surfaces 31L and 31R come into contact with the ribs 44 to regulate the movement when the cover member 30 moves in the left-right direction. Therefore, it is possible to more effectively suppress rattling of the cover member 30 in the left-right direction.

Furthermore, since the rib 44, particularly the upper wall-side rib 45 is provided at a position slightly close to the side of the slide cover main body 41 from the distal end portion of the upper wall 42 in the left-right direction, the distal end portion of the upper wall 42 in the left-right direction is located above the both end surfaces 31L and 31R of the coupling plate 31. As a result, the both end surfaces 31L and 31R of the coupling plate 31 are protected, and an effect of suppressing the occurrence of the turn-up of the corner portion of the cover member 30 can also be expected.

As described above, in the slide device 1 according to the present embodiment, by providing the rib 44 on at least one of the upper wall 42 and the lower wall 43, when the upper wall 42 is displaced in the downward direction, the displacement amount can be suppressed, and the durability thereof can be improved. In the slide device 1 according to the present embodiment, as described above, the rib 44 includes the upper wall-side rib 45 and the lower wall-side rib 46 provided at positions slightly close to the side of the slide cover main body 41 from the distal end portions of the upper wall 42 and the lower wall 43 in the left-right direction, but the present invention is not limited thereto. Therefore, some other structures of the rib 44 will be exemplarily described below.

Figure 8:
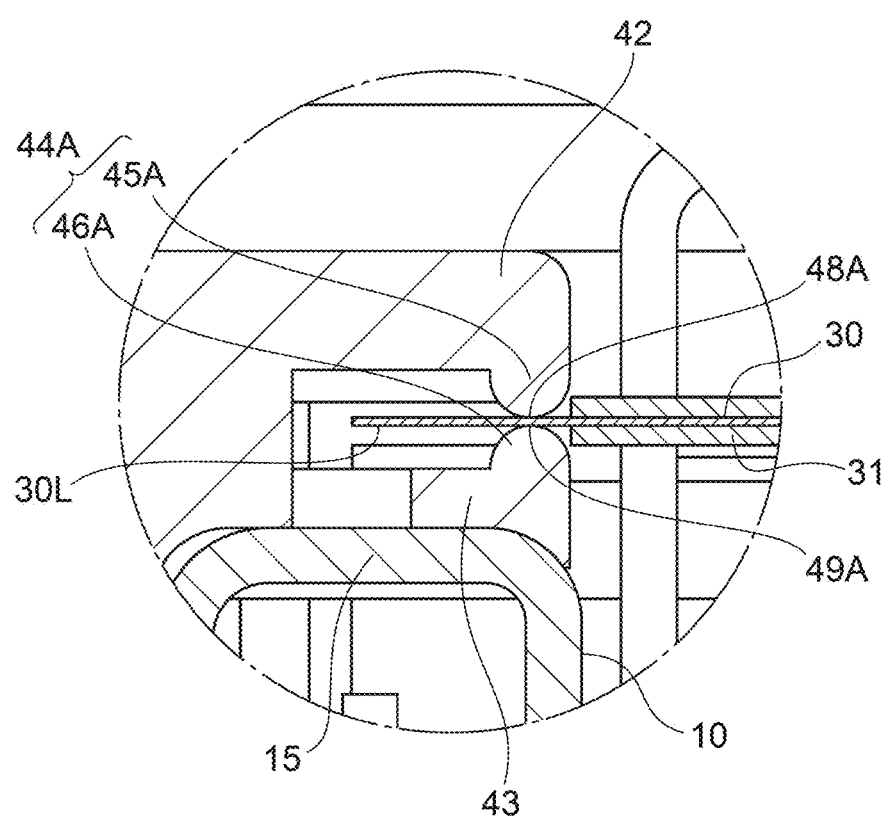
FIG. 8 is an enlarged view illustrating a modification example of the slide cover.

FIG. 8 is an enlarged view illustrating a modification example of the slide cover. In the present modification example, as illustrated in FIG. 8, an upper wall-side rib 45A and a lower wall-side rib 46A provided at the distal ends of the upper wall 42 and the lower wall 43 in the left-right direction are adopted as a rib 44A. Note that the slide device illustrated in the present modification example is similar to the slide device 1 according to the above-described embodiment except for the structure of the slide cover, and in FIG. 8, components common to those of the slide device 1 according to the embodiment are denoted by the same reference signs.

Also in the present modification example, the side edge portions 30L and 30R of the cover member 30 may be held by the rib 44A by being in contact with a tip 48A of the upper wall-side rib 45A and a tip 49A of the lower wall-side rib 46A. Therefore, even in the structure of the present modification example, similarly to the slide device 1 according to the above-described embodiment, it is possible to suppress rattling in the vertical direction while improving durability. In addition, as in the rib 44A shown in the present modification example, when the upper wall-side rib 45A and the lower wall-side rib 46A are formed at the distal ends of the upper wall 42 and the lower wall 43 in the left-right direction, it is possible to prevent foreign matter such as dust from entering between the rib 44A and the cover member 30 to damage the cover member 30.

Figure 9:
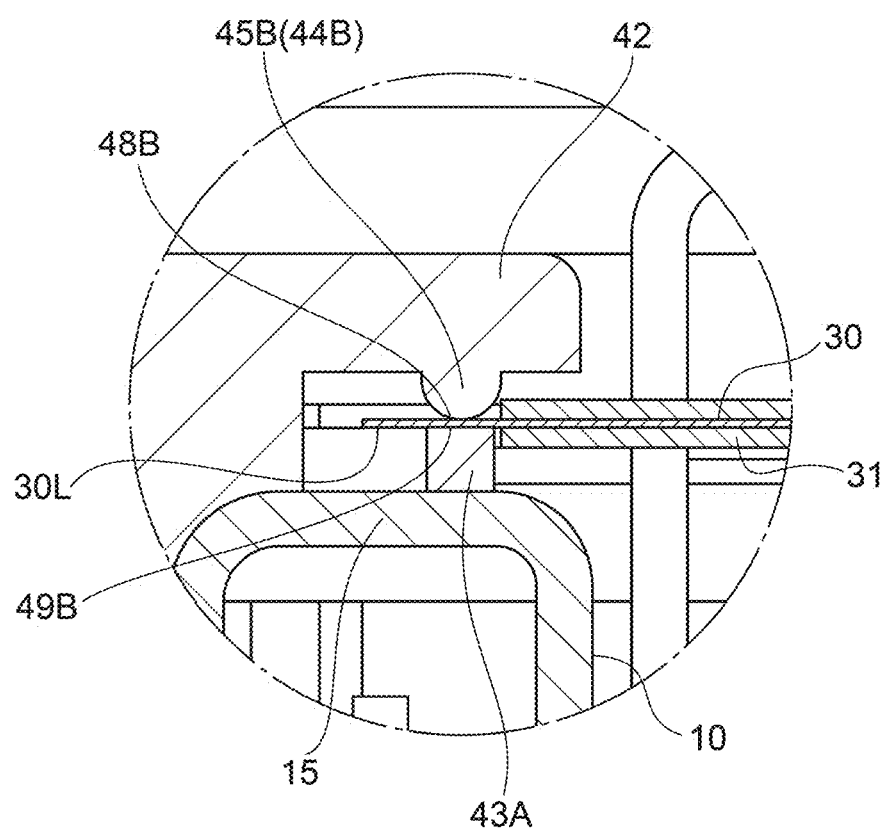
FIG. 9 is an enlarged view illustrating another modification example of the slide cover.

FIG. 9 is an enlarged view illustrating another modification example of the slide cover. In the present modification example, as illustrated in FIG. 9, a rib 44B is only an upper wall-side rib 45B provided on the upper wall 42, and no rib is provided on the lower wall 43A. Therefore, in the present modification example, the side edge portions 30L and 30R of the cover member 30 are sandwiched between a tip 48B of the upper wall-side rib 45B and a substantially flat upper surface 49B of the lower wall 43A. Note that the slide device illustrated in the present modification example is similar to the slide device 1 according to the above-described embodiment except for the structure of the slide cover, and thus, in FIG. 9, components common to those of the slide device 1 according to the embodiment are denoted by the same reference signs.

In the present modification example, since the rib 44B is formed only of the upper wall-side rib 45B, it is preferable that the position and length of the lower wall 43A in the vertical and horizontal directions are adjusted. Specifically, the vertical and horizontal positions and lengths of the lower wall 43A are preferably adjusted so as to achieve the above-described sandwiching structure of the side edge portions 30L and 30R of the cover member 30 and the above-described contact structure between the both end surfaces 31L and 31R of the coupling plate 31 and the rib 44B.

Even in a case in which the rib 44B is provided only on the upper wall 42 as in the present modification example, the side edge portions 30L and 30R of the cover member 30 can be sandwiched between the rib and the upper surface of the lower wall 43A, so that the same effect as that of the slide device 1 according to the above-described embodiment can be expected. Furthermore, since it is not necessary to have a structure in which the ribs face each other, the length of the slide cover in the vertical direction can be shortened.

In this modification example, the case where only the upper wall-side rib 45B is adopted as the rib 44B has been exemplified, but only a lower wall-side rib may be adopted. Furthermore, even in a case in which the rib 44B is provided only on at least one of the upper wall 42 and the lower wall 43A, backlash in the left-right direction can be suppressed by bringing both end surfaces 31L and 31R of the coupling plate 31 into contact with each other along the side surface on the inner side in the left-right direction of the rib 44B.

Note that, in the embodiment and the modification examples described above, as the slide cover 40, the slide cover main body 41 provided with the upper wall 42 and the lower wall 43 is exemplified, but the slide cover main body 41 may be substituted by, for example, a part of the fixed rail 10. Similarly, the lower wall 43 included in the slide cover 40 may be configured by a part of the upper surface 15 of the fixed rail 10.

The present disclosure is not limited to the above-described embodiment, and various modifications can be made without departing from the gist of the present disclosure. These are all included in the technical idea of the present disclosure. Furthermore, the above-described respective components can be implemented in combination within a range in which their functions can be maintained.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to.") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A slide device, comprising:
   a fixed rail including an opening groove in an upper portion of the fixed rail;
   a movable rail slidably coupled to the fixed rail;
   a belt-shaped cover member including a coupling plate coupled to the movable rail at an end portion of the belt-shaped cover member, the belt-shaped cover member closing the opening groove between a longitudinal end portion of the fixed rail and the movable rail; and
   a slide cover that covers a periphery of a side edge portion of the cover member, wherein the slide cover includes:
      an upper wall facing an upper surface of the side edge portion of the cover member;
      a lower wall facing a lower surface of the side edge portion of the cover member; and
      a rib disposed along a sliding direction of the movable rail and protruding in a direction toward the side edge portion of the cover member, on at least one of a surface of the upper wall facing the side edge portion of the cover member or a surface of the lower wall facing the side edge portion of the cover member,
   wherein the rib comprises:
   an upper wall-side rib provided on the surface of the upper wall, the upper wall-side rib facing the side edge portion of the cover member; and
   a lower wall-side rib provided on the surface of the lower wall, the lower wall-side rib facing the side edge portion of the cover member,
   wherein the upper wall-side rib and the lower wall-side rib are disposed such that at least a part of the upper wall-side rib and a part of the lower wall-side rib face each other in a vertical direction with respect to a direction in which the side edge portion of the cover member interposed between the upper wall-side rib and the lower wall-side rib extends.

2. The slide device according to claim 1, wherein at least a part of the side edge portion of the cover member is sandwiched between the upper wall-side rib and the lower wall-side rib.

3. The slide device according to claim 1, further comprising a reel rotatably attached to the longitudinal end portion of the fixed rail and around which the cover member is wound.

4. The slide device according to claim 1, wherein the coupling plate is configured by a rectangular plate-like body attached to an end portion of the cover member on a side of the movable rail, and both end surfaces of the coupling plate in a width direction intersecting with the sliding direction extend along the rib adjacent to both the end surfaces.

5. The slide device according to claim 1, wherein:
   the movable rail includes a coupling piece adjusted such that a length in a width direction intersecting the sliding direction gradually decreases from a proximal end portion toward a distal end portion, and
   the coupling plate includes a coupling hole into which the coupling piece is inserted, the coupling hole having a length in a direction along the width direction that is shorter than a length in the width direction at the proximal end portion of the coupling piece.

* * * * *